(12) United States Patent
Han

(10) Patent No.: US 11,889,241 B2
(45) Date of Patent: Jan. 30, 2024

(54) IMAGE SENSING DEVICE FOR DETECTING AND CORRECTING COLOR NOISE OF A TARGET PIXEL VALUE AND OPERATING METHOD THEREOF

(71) Applicant: SK hynix Inc., Gyeonggi-do (KR)

(72) Inventor: Ji Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 126 days.

(21) Appl. No.: 17/492,037

(22) Filed: Oct. 1, 2021

(65) Prior Publication Data

US 2022/0345674 A1 Oct. 27, 2022

(30) Foreign Application Priority Data

Apr. 22, 2021 (KR) .................. 10-2021-0052598

(51) Int. Cl.
*H04N 9/64* (2023.01)
*H04N 25/60* (2023.01)
*H04N 25/11* (2023.01)
*H04N 9/68* (2023.01)
*H04N 23/86* (2023.01)
*G06T 5/00* (2006.01)
*G06F 16/58* (2019.01)

(52) U.S. Cl.
CPC .............. *H04N 9/646* (2013.01); *H04N 25/60* (2023.01)

(58) Field of Classification Search
CPC ........ H04N 9/646; H04N 25/60; H04N 25/11; H04N 23/86; H04N 9/68; H04N 9/64; G06T 5/00; G06T 5/002; G06T 5/50; G06K 7/146; G06K 15/872; G06F 7/42; G06F 7/443; G06F 7/461; G06F 7/485; G06F 7/49921; G06F 16/5862; G06F 16/17857; G06F 2207/20172; G06F 2207/20182; G06F 2207/20192; G06F 2207/20201; G06F 2207/20204; G06F 2207/20208

See application file for complete search history.

(56) References Cited

U.S. PATENT DOCUMENTS

| 8,145,014 | B2 * | 3/2012 | Kwak | .................... H04N 9/646 |
| | | | | 382/300 |
| 9,685,473 | B2 * | 6/2017 | Park | ....................... H04N 25/63 |
| 2003/0228067 | A1 * | 12/2003 | Miyake | ..................... G06T 5/50 |
| | | | | 382/275 |
| 2007/0035836 | A1 * | 2/2007 | Wu | ........................ H04N 9/646 |
| | | | | 348/223.1 |
| 2007/0097391 | A1 * | 5/2007 | Hwang | .................. G06T 5/002 |
| | | | | 358/1.9 |

(Continued)

FOREIGN PATENT DOCUMENTS

KR 10-0780242 B1 11/2007
KR 10-2019-0119548 A 10/2019

*Primary Examiner* — Marly S Camargo
(74) *Attorney, Agent, or Firm* — IP & T GROUP LLP

(57) ABSTRACT

Disclosed is an image sensing device and an operating method thereof. The image sensing device may include an analyzer suitable for analyzing a state of each of multiple kernels based on system information and a plurality of pixel values, a detector suitable for detecting color noise of a target pixel value among pixel values included in a target kernel among the multiple kernels, according to the analysis result of the analyzer, and a corrector suitable for correcting the target pixel value according to the detection result of the detector.

19 Claims, 8 Drawing Sheets

(56) References Cited

U.S. PATENT DOCUMENTS

| | | | |
|---|---|---|---|
| 2007/0132864 A1* | 6/2007 | Tsuruoka | H04N 23/84 |
| | | | 348/241 |
| 2008/0112639 A1* | 5/2008 | Min | G06T 5/002 |
| | | | 382/264 |
| 2008/0284877 A1* | 11/2008 | Jaspers | H04N 9/646 |
| | | | 348/241 |
| 2009/0136127 A1* | 5/2009 | Kwak | H04N 9/646 |
| | | | 382/300 |
| 2013/0222531 A1* | 8/2013 | Hirai | H04N 25/60 |
| | | | 348/32 |
| 2022/0345674 A1* | 10/2022 | Han | H04N 9/646 |

* cited by examiner

FIG. 7

| | P01 | | P03 | | P05 | | P07 | |
|---|---|---|---|---|---|---|---|---|
| P10 | | P12 | | P14 | | P16 | | P18 |
| | P21 | | P23 | | P25 | | P27 | |
| P30 | | P32 | | P34 | | P36 | | P38 |
| | P41 | | P43 | | P45 | | P47 | |
| P50 | | P52 | | P54 | | P56 | | P58 |
| | P61 | | P63 | | P65 | | P67 | |
| P70 | | P72 | | P74 | | P76 | | P78 |
| | P81 | | P83 | | P85 | | P87 | |

< TV4

(STDG)

IMAGE SENSING DEVICE FOR DETECTING AND CORRECTING COLOR NOISE OF A TARGET PIXEL VALUE AND OPERATING METHOD THEREOF

CROSS-REFERENCE TO RELATED APPLICATION(S)

This application claims priority under 35 U.S.C. § 119 to Korean Patent Application No. 10-2021-0052598, filed on Apr. 22, 2021, the disclosure of which is incorporated herein by reference in its entirety.

BACKGROUND

1. Field

Various embodiments of the present disclosure relate to a semiconductor design technique, and more particularly, to an image sensing device and an operating method thereof.

2. Description of the Related Art

Image sensing devices are devices for capturing images using the property of a semiconductor which reacts to light. Image sensing devices are generally classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device that supports a denoise technology for a low illuminance image.

In accordance with an embodiment of the present disclosure, an image sensing device may include: an analyzer suitable for analyzing a state of each of multiple kernels based on system information and a plurality of pixel values; a detector suitable for detecting color noise of a target pixel value among pixel values included in a target kernel among the multiple kernels, according to the analysis result of the analyzer; and a corrector suitable for correcting the target pixel value according to the detection result of the detector.

In accordance with an embodiment, an image sensing device may include: an image sensor including a pixel array in which first is pixels, second pixels and third pixels are arranged in a predetermined color pattern, each of the first pixels having a first color filter, each of the second pixels having a second color filter and each of the third pixels having a third color filter, and suitable for generating a plurality of pixel values corresponding to the color pattern; and an image processor suitable for detecting color noise of each of multiple kernels based on system information and the plurality of pixel values, and detecting color noise of a target pixel value included in a target kernel among the multiple kernels by using all pixel values included in the target kernel.

In accordance with an embodiment of the present disclosure, an operating method of an image sensing device may include: determining saturation and texture of each of multiple kernels; detecting color noise of a target pixel value among pixel values included in a target kernel among the multiple kernels when the target kernel is a low saturation and flat region; and correcting the color noise of the target pixel value.

In accordance with an embodiment, an image sensing device may include: an image sensor including a pixel array suitable for generating a plurality of pixel values corresponding to a set frame; and an image processor suitable for: determining whether the frame has low illuminance; when it is determined that the frame has the low illuminance, selecting pixel values corresponding to a target kernel among the frame; determining whether the target kernel is a flat is region and a low saturation region; when it is determined that the target kernel is the flat region and the low saturation region, detecting whether a target pixel value of the target kernel corresponds to color noise based on other pixel values of the target kernel, which have other color channels different from a color channel of the target pixel value; and when it is detected that the target kernel corresponds to the color noise, correcting the target pixel value using the other pixel values.

BRIEF DESCRIPTION OF THE DRAWINGS

FIG. 7 is a diagram illustrating an operation of a second determination component illustrated in FIG. 5 in accordance with an embodiment of the present disclosure.

FIG. 8 is a diagram illustrating an operation of a third determination component illustrated in FIG. 5 in accordance with an embodiment of the present disclosure.

FIG. 9 is a diagram illustrating an operation of a detector illustrated in FIG. 4 in accordance with an embodiment of the present disclosure.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as is being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned, In the description throughout the specification, some components are described in singular forms, but the present disclosure is not limited thereto, and it will be understood that the components may be formed in plural.

Figure 1:
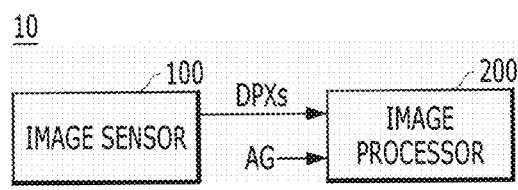
FIG. 1 is a block diagram illustrating an image sensing device in accordance with an embodiment of the present disclosure.

FIG. 1 is a block diagram illustrating an image sensing device 10 in accordance with an embodiment of the present disclosure.

Referring to FIG. 1, the image sensing device 10 may include an image sensor 100 and an image processor 200.

The image sensor 100 may generate a plurality of pixel values DPXs corresponding to a captured image. That is, the image sensor 100 may generate the plurality of pixel values DPXs corresponding to a single frame.

The image processor 200 may detect and correct color noise for each kernel based on system information AG and the plurality of pixel values DPXs. Particularly, the image processor 200 may detect color noise of a target pixel value included in a target kernel by using all pixel values included in the target kernel.

Figure 2:
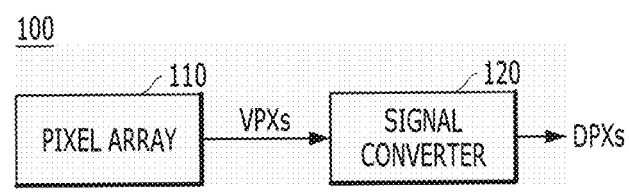
FIG. 2 is a block diagram illustrating an image sensor illustrated in FIG. 1 in accordance with an embodiment of the present disclosure.

FIG. 2 is a block diagram illustrating an image sensor in accordance with an embodiment of the present disclosure, for example, the image sensor 100 illustrated in FIG. 1.

Referring to FIG. 2, the image sensor 100 may include a pixel array 110 and a signal converter 120.

Figure 3:
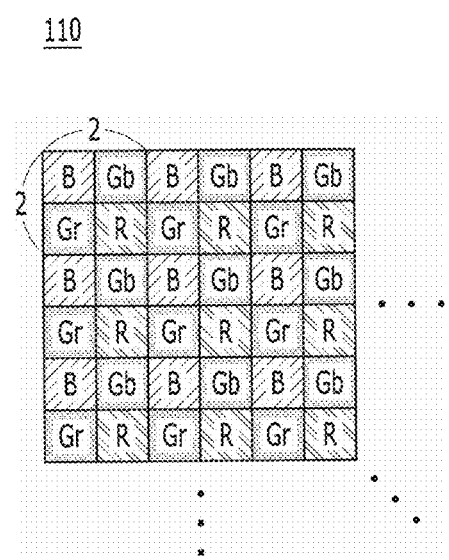
FIG. 3 is a configuration diagram illustrating an example of a pixel array illustrated in FIG. 2 in accordance with an embodiment of the present disclosure.

The pixel array 110 may include a plurality of pixels arranged in row and column directions (refer to FIG. 3). The pixel array 110 may generate a plurality of pixel signals VPXs for each row. For example, the pixel array 110 may generate the plurality of pixel signals VPXs from pixels arranged in a first row during a first row time, and generate the plurality of pixel signals VPXs from pixels arranged in an n row during an $n^{th}$ row time, where "n" is an integer greater than 2. Each of the pixel signals VPXs may be an analog pixel signal.

The signal converter 120 may convert analog pixel signals VPXs into digital pixel values DPXs. The digital pixel values DPXs may be outputted corresponding to a Bayer pattern, which is described below. For example, the signal converter 120 may include an analog to digital converter.

FIG. 3 is a configuration diagram illustrating an example of a pixel array in accordance with an embodiment of the present disclosure, for example, the pixel array 110 illustrated in FIG. 2.

Referring to FIG. 3, the pixel array 110 may be arranged in a predetermined pattern. For example, the pixel array 110 may be arranged in a Bayer pattern. The Bayer pattern may be composed of repeating cells each having 2×2 pixels. In each of the cells, two pixels Gb and Gr each having a green color filter may be disposed to diagonally face each other at corners thereof, and a pixel B having a blue color filter and a pixel R having a red color filter may be disposed at the other corners thereof. The four pixels B, Gb, Gr and R are not necessarily limited to the arrangement structure illustrated in FIG. 3, but may be variously disposed based on the Bayer pattern described above. Although an embodiment describes the Bayer pattern as an example, the present disclosure is not necessarily limited thereto, and may be applied to various patterns such as a Quad pattern.

The pixel array 110 may be divided into "n×n" pixels, where "n" is a natural number greater than or equal to 2. Hereinafter, an example in which pixel values corresponding to 8×8 pixels are included in one kernel is described.

Figure 4:
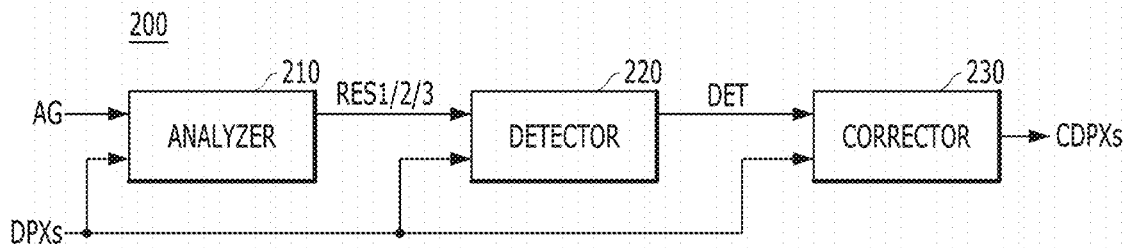
FIG. 4 is a block diagram illustrating an image processor illustrated in FIG. 1 in accordance with an embodiment of the present disclosure.

FIG. 4 is a block diagram illustrating an image processor in accordance with an embodiment of the present disclosure, for example, the image processor 200 illustrated in FIG. 1.

Referring to FIG. 4, the image processor 200 may include an analyzer 210, a detector 220 and a corrector 230.

The analyzer 210 may analyze a state for each kernel based on the system information AG and the plurality of pixel values DPXs. The system information AG may include an analog gain value. The state may be related to illuminance of the target kernel, saturation of is the target kernel, and texture of the target kernel.

The detector 220 may detect color noise of a target pixel value among pixel values included in the target kernel, based on an analysis result RES1/2/3 of the analyzer 210 and the plurality of pixel values DPXs. For example, the detector 220 may detect the color noise of the target pixel value based on pixel values belonging to color channels different from a color channel to which the target pixel value belongs among the pixel values included in the target kernel. The detector 220 may perform an operation of detecting the color noise when the illuminance of the target kernel, the saturation of the target kernel and/or the texture of the target kernel meet one or more predetermined conditions.

The corrector 230 may correct the target pixel value based on a detection result DET of the detector 220 and the plurality of pixel values DPXs. For example, the corrector 230 may correct the color noise based on pixel values belonging to color channels different from a color channel to which the target pixel value belongs among the pixel values included in the target kernel.

Figure 5:
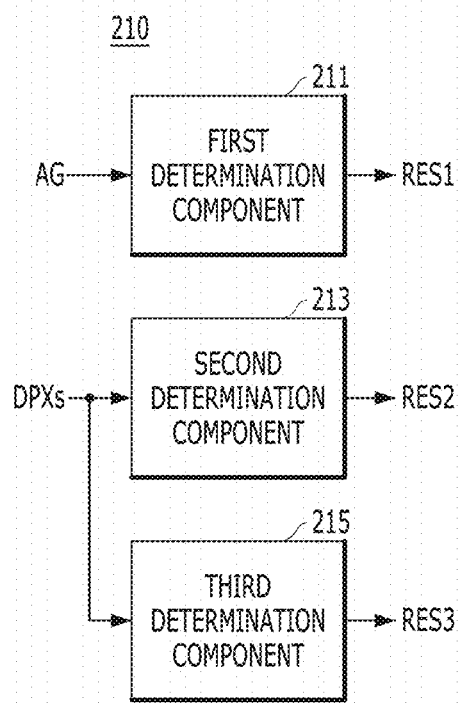
FIG. 5 is a block diagram illustrating an analyzer illustrated in FIG. 4 in accordance with an embodiment of the present disclosure.

FIG. 5 is a block diagram illustrating an analyzer in accordance with an embodiment of the present disclosure, for example, the analyzer 210 illustrated in FIG. 4.

Referring to FIG. 5, the analyzer 210 may include a first determination component 211, a second determination component 213 and a third determination component 215. The first determination component 211, the second determination component 213 and the third determination component 215 include all circuits, systems, software, firmware and devices necessary for their respective operations and functions.

The first determination component 211 may determine whether the single frame corresponding to the plurality of pixel values DPXs has low illuminance based on the system information AG. For example, when the analog gain value is greater than or equal to a predetermined value, the first determination component 211 may determine that a current frame is in a low illuminance state.

Typically, an analog gain may have a relatively large value under low illuminance conditions. The first determination component 211 may output a first determination signal RES1 to the detector 220 as an analysis result related to the low illuminance.

The second determination component 213 may determine whether the texture is a flat region for each kernel based on the plurality of pixel values DPXs. For example, the second determination component 213 may determine whether the texture of the target kernel is the flat region, based on pixel values of a green channel among the pixel values included in the target kernel. The second determination component 213 may output a second determination signal RES2 to the detector 220 as an analysis result related to the texture.

The third determination component 215 may determine whether each kernel is a low saturation region, based on the plurality of pixel values DPXs. For example, the third determination component 215 may determine whether the target kernel is the low saturation region, based on a first average value of pixel values belonging to a first color channel which is the same as a color channel to which the target pixel value belongs among the pixel values included in the target kernel, a second average value of pixel values belonging to a second color channel among the pixel values included in the target kernel and a third average value of pixel values belonging to a third color channel among the pixel values included in the target kernel.

Hereinafter, an operation of the image sensing device 10 in accordance with an embodiment, which has the above-described configuration, is described with reference to FIGS. 6 to 11.

Figure 6:
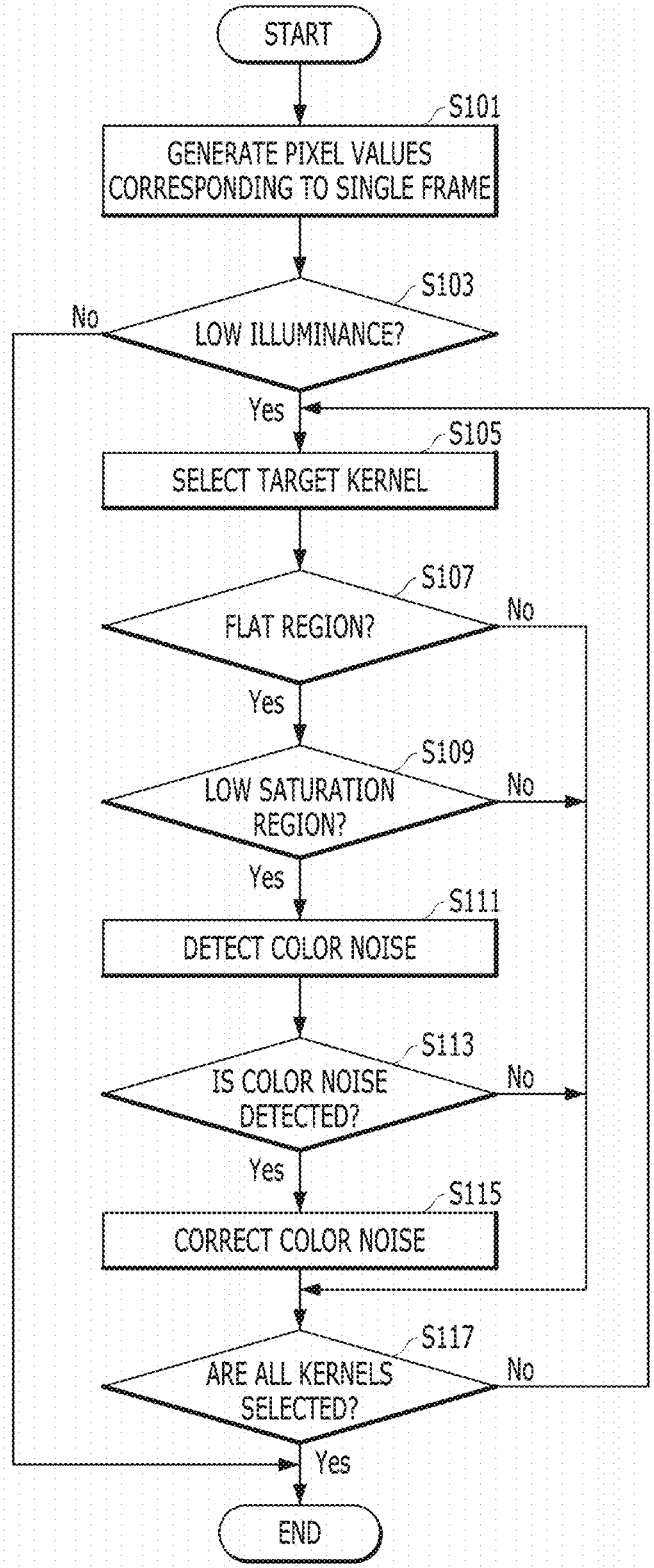
FIG. 6 is a flowchart illustrating an operation of the image sensing device illustrated in FIG. 1 in accordance with an embodiment of the present disclosure.

FIG. 6 is a flowchart illustrating the operation of an image sensing device in accordance with an embodiment of the present disclosure, for example, the image sensing device 10 illustrated in FIG. 1.

Referring to FIG. 6, the image sensor 100 may generate a plurality of pixel values DPXs corresponding to a single frame, in operation S101.

The image processor 200 may determine whether the single frame has low illuminance, in operation S103. For example, when the analog gain value is greater than or equal to the predetermined value, the first determination component 211 may determine that a current frame is in a low illuminance state. Typically, the analog gain value may have a relatively large value under low illuminance conditions.

When it is determined that the single frame has the low illuminance (that is, "Yes" in S103), the image processor 200 may determine saturation and texture for each kernel. First, the image processor 200 may select a target kernel in operation S105. In some embodiments, the target kernel may include 8×8 pixel values on the basis of a target pixel value. The target pixel value may refer to a pixel value of a pixel disposed at the center among pixel values of 8×8 pixels. Next, the image processor 200 may determine whether the target kernel is a flat region, in operation S107. For example, the second determination component 213 may determine whether the texture of the target kernel is the flat region, based on the pixel values belonging to the green channel among the pixel values included in the target kernel. When it is determined that the texture of the target kernel is the flat region (that is, "Yes" in S107), the image processor 200 may determine whether the target kernel is a low saturation region, in operation S109. For example, the third determination component 215 may determine whether the target kernel is the low saturation region, based on a first average value of pixel values belonging to a first color channel which is the same as a color channel to which the target pixel value belongs among the pixel values included in the target kernel, a second average value of pixel values belonging to a second color channel among the pixel values included in the target kernel and a third average value of pixel values belonging to a third color channel among the pixel values included in the target kernel.

When it is determined that the target kernel is the low saturation region (that is, "Yes" in S109), the image processor 200 may detect whether the target pixel value included in the target kernel is color noise, in operation S111. For example, the detector 220 may detect the color noise of the target pixel value based on pixel values belonging to color channels different from a color channel to which the target pixel value belongs among the pixel values included in the target kernel. As described above, the detector 220 may perform an operation of detecting the color noise only when the state of the target kernel meets predetermined conditions, that is, only when the target kernel has the low illuminance and is the low saturation region, and the texture of the target kernel is the flat region.

When it is determined that the color noise is detected (that is, "Yes" in S113), the image processor 200 may correct the color noise in operation S115. For example, the corrector 230 may correct the color noise based on pixel values belonging to color channels, that is, the second and third color channels, which are different from a color channel to which the target pixel value belongs among the pixel values included in the target kernel.

The above-described operations S105 to S115 may be repeated until it is determined in operation S117 that the respective kernels included in the single frame are selected as the target kernels.

FIG. 7 is a diagram illustrating an operation of a second determination component in accordance with an embodiment of the present disclosure, for example, the second determination component 213 illustrated in FIG. 5.

Referring to FIG. 7, the second determination component 213 may calculate a standard deviation value STDG based on pixel values P01, P03, P05, P07, P10, P12, P14, P16, P18, P21, P23, P25, P27, P30, P32, P34, P36, P38, P41, P43, P45, P47, P50, P52, P54, P56, P58, P61, P63, P65, P67, P70, P72, P74, P76, P78, P81, P83, P85 and P87 belonging to the green channel included in the target kernel. The standard deviation value STDG may be defined by the following Equation 1.

$$STDG=[gain/4*\{\Sigma|Gpix-Gavg|\}\pm offset \quad [Equation\ 1]$$

Herein, "Gpix" may refer to each of the pixel values belonging to the green channel, "Gang" may refer to an average value AVG2 of the pixel values P01 to P87 belonging to the green channel, and "Gain" and "offset" may refer to variables that are scaled corresponding to a fourth threshold value TV4.

The second determination component 213 may determine that the target kernel is the flat region when the standard deviation value STDG is less than the fourth threshold value TV4. For reference, the fourth threshold value TV4 may be a value that is adaptively adjusted according to the average value AVG2 of the pixel values P01 to P87 belonging to the green channel.

Figure 8:
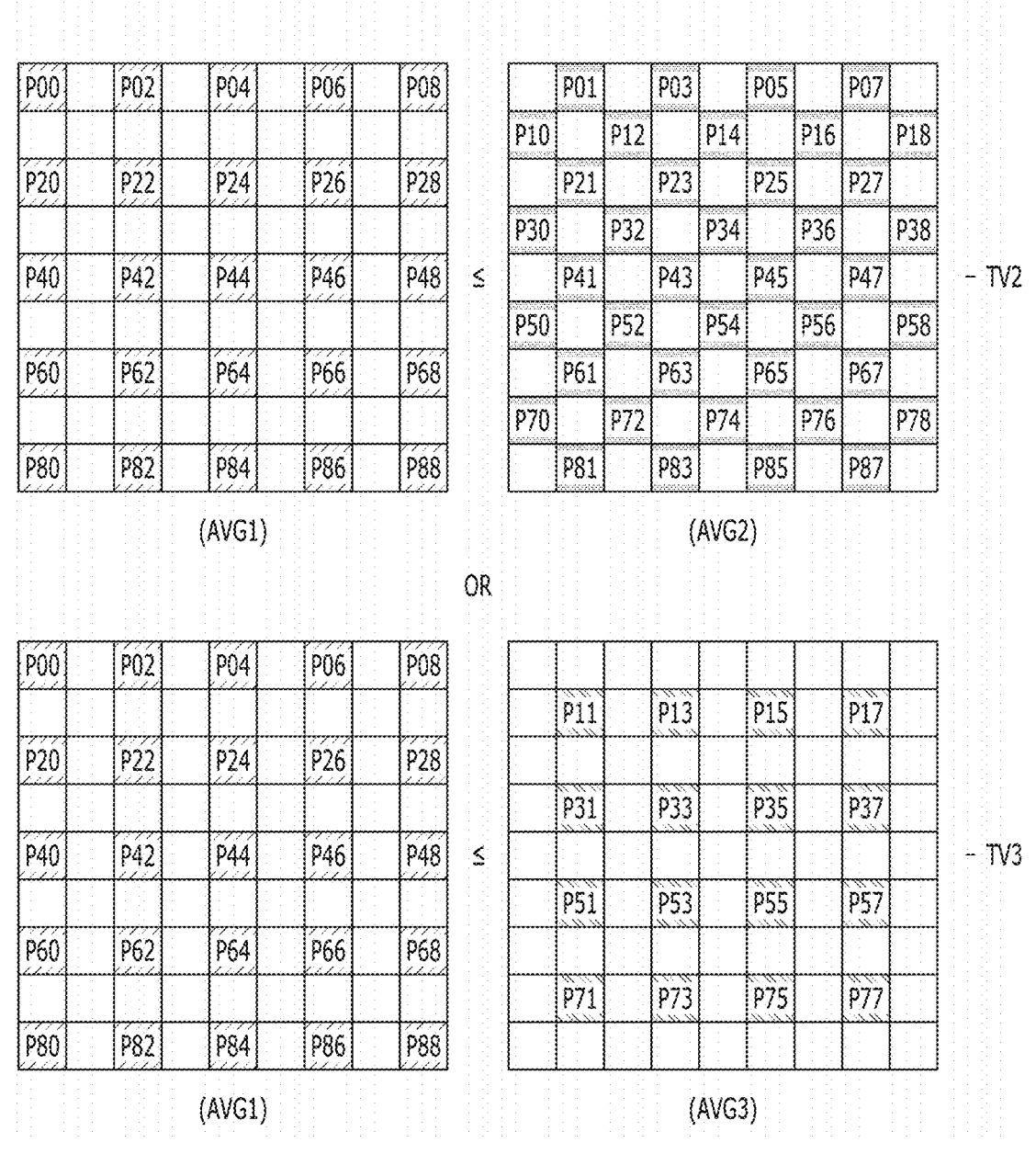

FIG. 8 is a diagram illustrating an operation of a third determination component in accordance with an embodiment of the present disclosure, for example, the third determination component 215 illustrated in FIG. 5.

Referring to FIG. 8, the third determination component 215 may determine whether the target kernel is a low saturation region, based on a first average value AVG1 of pixel values P00, P02, P04, P06, P08, P20, P22, P24, P26, P28, P40, P42, P44, P46, P48, P60, P62, P64, P66, P68, P80, P82, P84, P86 and P88 belonging to a blue channel to which the target pixel value P44 belongs, a second average value AVG2 of pixel values P01, P03, P05, P07, P10, P12, P14, P16, P18, P21, P23, P25, P27, P30, P32, P34, P36, P38, P41, P43, P45, P47, P50, P52, P54, P56, P58, P61, P63, P65, P67, P70, P72, P74, P76, P78, P81, P83, P85 and P87 belonging to a green channel and a third IQ average value AVG3 of pixel values P11, P13, P15, P17, P31, P33, P35, P37, P51, P53, P55, P57, P71, P73, P75 and P77 belonging to a red channel. For example, when the first average value AVG1 is less than or equal to a second reference value or the first average value AVG1 is less than or equal to a third reference value, the third determination component 215 may determine that the target kernel is the low saturation region. The second reference value may be a value obtained by subtracting a second threshold value TV2 from the second average value AVG2. The second threshold value TV2 may be a value that is adaptively adjusted according to the second average value AVG2. The third reference value may be a value obtained by subtracting a third threshold value TV3 from the third average value AVG3. The third threshold value TV3 may be a value that is adaptively adjusted according to the third average value AVG3.

Figure 9:
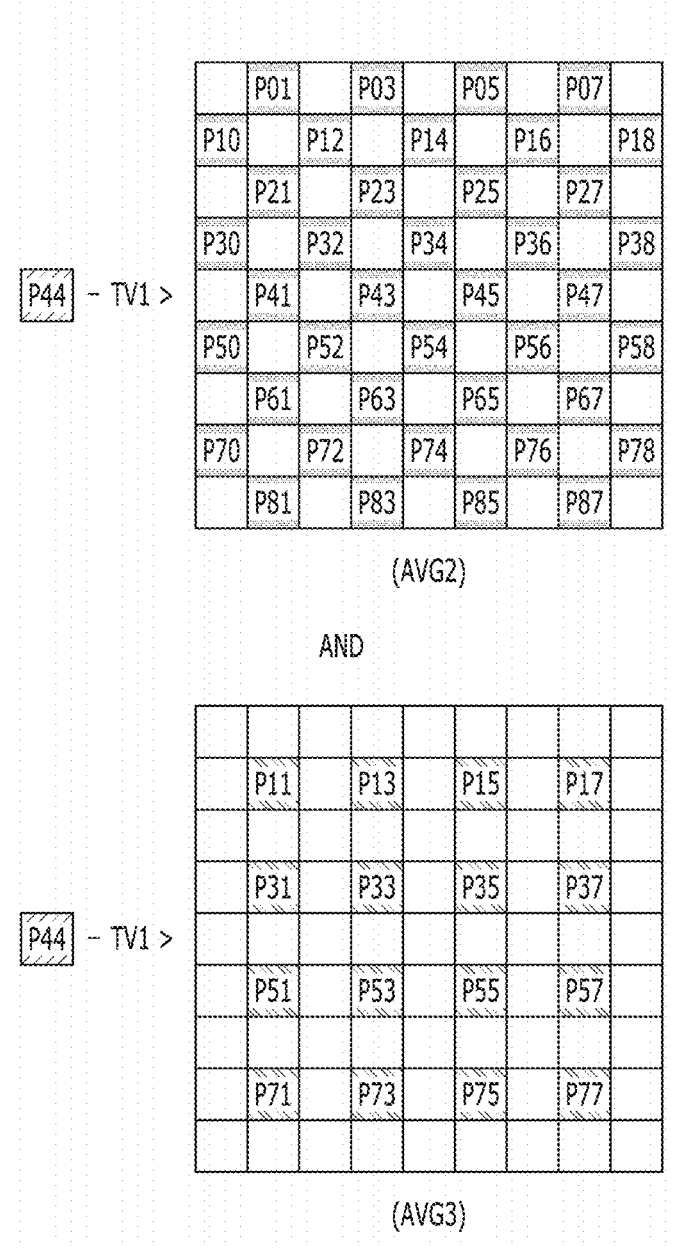

FIG. 9 is a diagram illustrating an operation of a detector in accordance with an embodiment of the present disclosure, for example, the detector 220 illustrated in FIG. 4.

Referring to FIG. 9, the detector 220 may detect the target pixel value P44 as the color noise when a first reference value obtained by subtracting a first threshold value TV1 from the target pixel value P44 is greater than the average value AVG2 of the pixel values P01 to P87 belonging to the green channel, and the first reference value is greater than the average value AVG3 of the pixel values P11 to P77 belonging to the red channel. The first threshold value TV1 may be a value that is adaptively adjusted according to the target pixel value P44.

Figure 10:
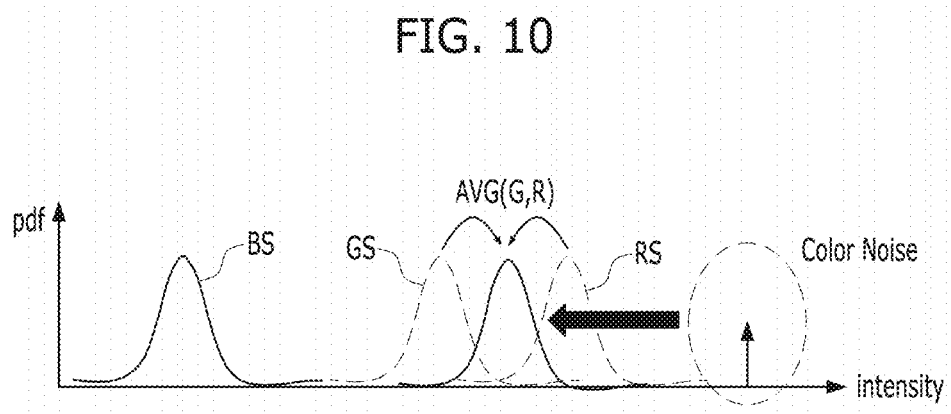
FIG. 10 is a graph illustrating an operation of a corrector illustrated in FIG. 4 in accordance with an embodiment of the present disclosure.

FIG. 10 is a graph illustrating an operation of a corrector in accordance with an embodiment of the present disclosure, for example, the corrector 230 illustrated in FIG. 4.

Referring to FIG. 10, the corrector 230 may correct the color noise by replacing the target pixel value P44 with a correction value. The correction value may be an average value (i.e., AVG(G,R)) of the second average value AVG2 of the pixel values P01 to P87 belonging to the green channel (i.e., GS) and the third average value AVG3 of the pixel values P11 to P77 belonging to the red channel (i.e., RS). For example, when the target pixel value P44 is not present in distribution BS of the pixel values P00 to P88 belonging to the blue channel, the target pixel value P44 may be replaced with the correction value belonging to average distribution of distribution GS of the pixel values P01 to P87 belonging to the green channel and distribution RS of the pixel values P11 to P77 belonging to the red channel.

Figure 11:
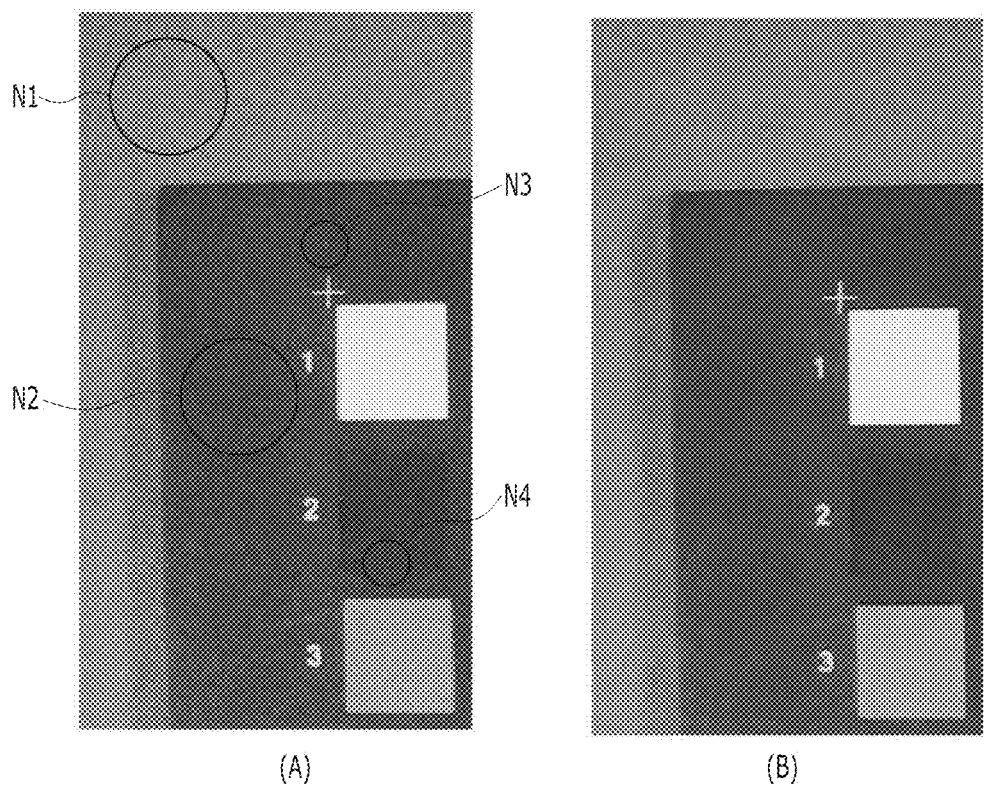
FIG. 11 is a diagram illustrating a denoise performance in accordance with an embodiment of the present disclosure.

FIG. 11 is a diagram illustrating a denoise performance in accordance with an embodiment of the present disclosure.

Referring to FIG. 11, it may be seen that color noise of a low illuminance image B according to an embodiment has been removed, unlike a low illuminance image A according to some methods which have been proposed. For example, the low illuminance image A has degraded image quality due to duster color noise N1 and N2 and impulse color noise N3 and N4 that frequently occur in a low saturation and flat region, but the low illuminance image B according to an embodiment may have excellent image quality in which duster color noise N1 and N2 and impulse color noise N3 and N4 are removed.

According to an embodiment of the present disclosure, color noise of a low illuminance image may be removed.

According to an embodiment of the present disclosure, a denoise technology for a low illuminance image may be supported, thereby obtaining the low illuminance image having excellent image quality.

While the present disclosure has been illustrated and described with respect to specific embodiment, the disclosed embodiment is provided for the description, and not intended to be restrictive. Further, it is noted that the present disclosure may be achieved in various ways through substitution, change, and modification that fall within the scope of the following claims, as those skilled in the art will recognize in light of the present disclosure. The embodiments may be combined to form additional embodiments.

What is claimed is:

1. An image sensing device comprising:
    an analyzer suitable for analyzing a state of each of multiple kernels based on an analog gain value and a plurality of pixel values;
    a detector suitable for detecting color noise of a target pixel value among pixel values included in a target kernel among the multiple kernels, according to the analysis result of the analyzer; and
    a corrector suitable for correcting the target pixel value according to the detection result of the detector.

2. The image sensing device of claim 1, wherein the detector detects the color noise of the target pixel value when an average value of pixel values belonging to a second color channel among the pixel values included in the target kernel is less than or equal to a first reference value, and an average value of pixel values belonging to a third color channel among the pixel values included in the target kernel is less than or equal to the first reference value, and
    wherein the first reference value is a value obtained by subtracting a first threshold value from the target pixel value.

3. The image sensing device of claim 1, wherein the analyzer comprises:
    a first determination component suitable for determining whether a single frame corresponding to the plurality of pixel values has low illuminance based on the analog gain value;
    a second determination component suitable for determining whether texture of each kernel is a flat region, based on the plurality of pixel values; and
    a third determination component suitable for determining whether each kernel is a low saturation region, based on the plurality of pixel values.

4. The image sensing device of claim 3, wherein the third determination component determines whether the target kernel is the low saturation region, based on a first average value of pixel values belonging to a first color channel to which the target pixel value belongs among the pixel values included in the target kernel, a second average value of pixel values belonging to a second color channel among the pixel values included in the target kernel and a third average value of pixel values belonging to a third color channel among the pixel values included in the target kernel.

5. The image sensing device of claim 4, wherein the third determination component determines that the target kernel is the low saturation region when the first average value is less than or equal to a second reference value or a third reference value,
    wherein the second reference value is a value obtained by subtracting a second threshold value from the second average value, and
    wherein the third reference value is a value obtained by subtracting a third threshold value from the third average value.

6. The image sensing device of claim 3, wherein the second determination component calculates a standard deviation value based on pixel values belonging to a green channel included in the target kernel, and determines that the target kernel is the flat region when the standard deviation value is less than or equal to a fourth threshold value.

7. The image sensing device of claim 1, wherein the corrector corrects the color noise of the target pixel value based on pixel values belonging to color channels different from a color channel to which the target pixel value belongs among the pixel values included in the target kernel.

8. An image sensing device comprising:
an image sensor including a pixel array in which first pixels, second pixels and third pixels are arranged in a predetermined color pattern, each of the first pixels having a first color filter, each of the second pixels having a second color filter and each of the third pixels having a third color filter, and suitable for generating a plurality of pixel values corresponding to the color pattern; and
an image processor suitable for detecting color noise of each of multiple kernels based on an analog gain value and the plurality of pixel values, and detecting color noise of a target pixel value included in a target kernel among the multiple kernels by using all pixel values included in the target kernel.

9. The image sensing device of claim 8, wherein the image processor comprises:
an analyzer suitable for analyzing a state of each kernel based on the analog gain value and the plurality of pixel values;
a detector suitable for detecting the color noise of the target pixel value according to the analysis result of the analyzer; and
a corrector suitable for correcting the target pixel value according to the detection result of the detector.

10. The image sensing device of claim 9, wherein the detector detects the color noise of the target pixel value when an average value of pixel values belonging to a second color channel among the pixel values included in the target kernel is less than or equal to a first reference value, and an average value of pixel values belonging to a third color channel among the pixel values included in the target kernel is less than or equal to the first reference value, and
wherein the first reference value is a value obtained by subtracting a first threshold value from the target pixel value.

11. The image sensing device of claim 9, wherein the state includes illuminance, saturation and texture of each kernel.

12. The image sensing device of claim 9, wherein the analyzer comprises:
a first determination component suitable for determining whether a single frame corresponding to the plurality of pixel values has low illuminance based on the analog gain value;
a second determination component suitable for determining whether texture of each kernel is a flat region, based on the plurality of pixel values; and
a third determination component suitable for determining whether each kernel is a low saturation region, based on the plurality of pixel values.

13. The image sensing device of claim 12, wherein the third determination component determines whether the target kernel is the low saturation region, based on a first average value of pixel values belonging to a first color channel to which the target pixel value belongs among the pixel values included in the target kernel, a second average value of pixel values belonging to a second color channel among the pixel values included in the target kernel and a third average value of pixel values belonging to a third color channel among the pixel values included in the target kernel.

14. The image sensing device of claim 13, wherein the third determination component determines that the target kernel is the low saturation region when the first average value is less than or equal to a second reference value or a third reference value,
wherein the second reference value is a value obtained by subtracting a second threshold value from the second average value, and
wherein the third reference value is a value obtained by subtracting a third threshold value from the third average value.

15. The image sensing device of claim 12, wherein the second determination component calculates a standard deviation value based on pixel values belonging to a green channel included in the target kernel, and determines that the target kernel is the flat region when the standard deviation value is less than or equal to a fourth threshold value.

16. The image sensing device of claim 9, wherein the corrector corrects the color noise of the target pixel value based on pixel values belonging to color channels different from a color channel to which the target pixel value belongs among the pixel values included in the target kernel.

17. An operating method of an image sensing device, comprising:
determining saturation and texture of each of multiple kernels;
detecting color noise of a target pixel value among pixel values included in a target kernel among the multiple kernels when the target kernel is a low saturation region, not a high saturation region, and a flat region; and
correcting the color noise of the target pixel value.

18. The operating method of claim 17, further comprising determining whether a single frame has low illuminance based on an analog gain value,
wherein the determining of the saturation and texture of each kernel is performed when the single frame has the low illuminance.

19. An image sensing device comprising:
an image sensor including a pixel array suitable for generating a plurality of pixel values corresponding to a set frame; and
an image processor suitable for:
determining whether the frame has low illuminance;
when it is determined that the frame has the low illuminance, selecting pixel values corresponding to a target kernel among the frame;
determining whether the target kernel is a flat region and a low saturation region;
when it is determined that the target kernel is the flat region and the low saturation region, detecting whether a target pixel value of the target kernel corresponds to color noise based on other pixel values of the target kernel, which have other color channels different from a color channel of the target pixel value; and
when it is detected that the target kernel corresponds to the color noise, correcting the target pixel value using the other pixel values.

* * * * *